(12) United States Patent
Brand et al.

(10) Patent No.: US 9,322,321 B2
(45) Date of Patent: Apr. 26, 2016

(54) FRESH AIR SYSTEM

(71) Applicant: Mahle International GmbH, Stuttgart (DE)

(72) Inventors: Winfried Brand, Stuttgart (DE); Ivano Morgillo, Neuhuetten (DE)

(73) Assignee: Mahle International GmbH (DE)

(*) Notice: Subject to any disclaimer, the term of this patent is extended or adjusted under 35 U.S.C. 154(b) by 130 days.

(21) Appl. No.: 14/180,332

(22) Filed: Feb. 13, 2014

(65) Prior Publication Data

US 2014/0224229 A1 Aug. 14, 2014

(30) Foreign Application Priority Data

Feb. 14, 2013 (DE) .................. 10 2013 202 448

(51) Int. Cl.
| | |
|---|---|
| F02B 33/00 | (2006.01) |
| F02B 33/02 | (2006.01) |
| F02B 29/04 | (2006.01) |
| F28F 9/02 | (2006.01) |
| F28D 21/00 | (2006.01) |

(52) U.S. Cl.
CPC ............. *F02B 33/02* (2013.01); *F02B 29/0462* (2013.01); *F02B 29/0475* (2013.01); *F28F 9/0219* (2013.01); *F28D 2021/0082* (2013.01); *F28F 2280/02* (2013.01); *Y02T 10/146* (2013.01)

(58) Field of Classification Search
CPC .. F02B 33/02; F02B 29/0462; F02B 29/0475; F28F 9/0219; F28F 2280/02; F28D 2021/0082; Y02T 10/146
USPC .......................... 123/563; 60/599; 165/67, 69
See application file for complete search history.

(56) References Cited

U.S. PATENT DOCUMENTS

| | | | | |
|---|---|---|---|---|
| 4,104,999 | A * | 8/1978 | Ullrich ................ | F02B 29/0462 123/563 |
| 4,823,868 | A | 4/1989 | Neebel | |
| 6,082,446 | A * | 7/2000 | Ahaus et al. .................. | 165/173 |
| 8,016,025 | B2 | 9/2011 | Brost et al. | |
| 8,286,615 | B2 * | 10/2012 | Dehnen et al. ................ | 123/542 |

(Continued)

FOREIGN PATENT DOCUMENTS

| | | |
|---|---|---|
| DE | 19853455 A1 | 6/1999 |
| DE | 102009038592 A1 | 3/2011 |

(Continued)

OTHER PUBLICATIONS

English abstract for DE19853455A1.

(Continued)

*Primary Examiner* — Thomas Denion
*Assistant Examiner* — Jason T Newton
(74) *Attorney, Agent, or Firm* — Fishman Stewart PLLC

(57) ABSTRACT

A fresh air system for supplying combustion chambers of an internal combustion engine with fresh air may include a housing through which a fresh air path is routed. The fresh air system may include a charge air cooler arranged in the fresh air path. The housing may include an insertion opening, through which the charge air cooler is laterally inserted into the housing transversely to the fresh air path. An outer end region of the charge air cooler may close off the insertion opening and include a circumferential holding flange. The circumferential holding flange may be clamped between a holding rim enclosing the insertion opening and a separate holding frame.

20 Claims, 3 Drawing Sheets

(56) References Cited

U.S. PATENT DOCUMENTS

| | | | |
|---|---|---|---|
| 8,671,919 B2* | 3/2014 | Nakasugi et al. | 123/563 |
| 9,175,596 B2* | 11/2015 | Eilemann | F02B 29/0462 |
| 2006/0185833 A1* | 8/2006 | Brost | F28D 1/05366 |
| | | | 165/149 |
| 2009/0014153 A1* | 1/2009 | Pimentel | F02B 29/0462 |
| | | | 165/67 |
| 2011/0088663 A1* | 4/2011 | Dehnen et al. | 123/542 |
| 2012/0210986 A1 | 8/2012 | Ghiani | |
| 2013/0180507 A1* | 7/2013 | Nakasugi et al. | 123/542 |
| 2014/0326222 A1* | 11/2014 | Hummel | F02M 35/10268 |
| | | | 123/542 |
| 2015/0204234 A1* | 7/2015 | Bauer | F02B 29/0462 |
| | | | 60/599 |

FOREIGN PATENT DOCUMENTS

| | | |
|---|---|---|
| EP | 0285504 A1 | 10/1988 |
| EP | 714797 A1 | 6/1996 |
| EP | 1785609 A1 | 5/2007 |
| EP | 2014892 A1 | 1/2009 |
| FR | 2645209 A1 | 10/1990 |
| JP | 2013-011175 A | 1/2013 |
| WO | WO-2012/159730 A1 | 11/2012 |

OTHER PUBLICATIONS

English abstract for EP0285504A1.
English abstract for EP0714797A1.
European Search Report for EP14153923.9, dated Mar. 24, 2014.
English abstract for FR 2645209.

* cited by examiner

FRESH AIR SYSTEM

CROSS-REFERENCE TO RELATED APPLICATIONS

This application claims priority to German Patent Application 10 2013 202 448.7, filed on Feb. 14, 2013, which is hereby incorporated by reference in its entirety.

TECHNICAL FIELD

The present invention relates to a fresh air system for supplying combustion chambers of a supercharged combustion engine with fresh air, in particular in a motor vehicle.

BACKGROUND

Such a fresh air system usually comprises a housing, through which a fresh air path is routed. In the case of a supercharged internal combustion engine it is usual to cool the supercharged fresh air, i.e. the charge air, prior to entry into the combustion chambers. To this end, such a fresh air system can be equipped with a charge air cooler, through which fresh air can flow and which is arranged in the fresh air path. Here, the charge air cooler can be inserted into the housing of the fresh air system in different ways. Conceivable in principle is a slide-in solution, in the case of which the charge air cooler is laterally slid or inserted into the housing, i.e. transversely to the flow direction. To this end, the housing can comprise a lateral insertion opening through which the charge air cooler can be laterally inserted into the housing transversely to the fresh air path. In the case of such a slide-in solution, the insertion opening can for example be closed off with an outer end region of the charge air cooler, which simultaneously comprises connections for feeding in and discharging a coolant. In order to realise adequate fixing of the charge air cooler on the housing in the region of the insertion opening and in order to achieve an adequate seal between charge air cooler and housing in the region of the insertion opening, a comparatively major effort can be involved.

SUMMARY

The present invention deals with the problem of stating an improved embodiment for a fresh air system of the type mentioned at the outset, which is characterized in particular by cost-effective producibility.

According to the invention, this problem is solved through the subject of the independent claim. Advantageous embodiments are subject of the dependent claims.

The invention is based on the general idea of fixing the charge air cooler on the housing in the region of the insertion opening with the help of a separate holding frame. With the help of such a holding frame, which with respect to the housing and with respect to the charge air cooler represents a separate component, adequate fixing and adequate sealing between charge air cooler and housing can be realised in the region of the insertion opening in a particularly simple and cost-effective manner. For this purpose, the charge air cooler is equipped on its outer end region with a circumferential holding flange, which following the sliding in of the charge air cooler into the housing on reaching its inserted end position comes to bear against a holding rim of the housing from the outside, which encloses the insertion opening. The separate holding frame is now likewise attached from the outside and fixed on the housing, wherein the holding flange is clamped, i.e. held with preload, between the holding rim and the holding frame. Here, the preload is orientated parallel to the slide-in direction of the charge air cooler. Fixing of the charge air cooler on the housing is effected with the help of the holding frame and can be realised comparatively easily. At best, only the holding frame has to be attached in order to fix the charge air cooler on the housing. The direct fixing of the holding frame on the housing, in particular in the region of the holding rim, thus leads to an indirect fixing of the charge air cooler on the housing or on the holding rim. Advantageously, further fastening elements for fixing the charge air cooler in the region of the slide-in opening on the housing can be omitted. Accordingly, an advantageous embodiment on the outer end region of the charge air cooler manages without further fastening means, which fasten the charge air cooler on the housing.

Practically, the holding frame is configured closed circumferentially, so that along the entire holding flange fixing of the charge air cooler on the housing can be realised.

In another embodiment, engagement elements can be provided on the housing in the region of the holding frame, which interact with counterpart engagement elements formed on the holding frame for fixing the holding frame on the housing and for clamping the holding flange. In particular, such engagement and counterpart engagement elements, which interact by pressing the holding frame against the housing and automatically engage with one another, can thus define an engagement. This simplifies the fixing of the holding frame on the housing. In particular, separate fastening means for fixing the holding frame on the housing and additional tools can be omitted. In particular, the holding frame can thus be fastened to the housing without tools.

Particularly cost effective and thus advantageous is a further development, in which the engagement elements are integrally moulded on the housing. Here, the housing can for example be produced an injection moulded part from plastic, so that the engagement elements can be particularly easily integrated in the injection moulded part.

In another advantageous development, the engagement elements can comprise a holding collar standing away from the housing towards the outside running circumferentially along the holding rim, which includes a plurality of engagement openings. The counterpart engagement elements can then practically have engagement hooks which are complementary to the engagement openings, which in particular can be configured spring-elastically transversely to the insertion direction, which engage in the engagement openings and which fix the holding frame on the holding collar. The engagement openings can either be designed as depressions, which do not penetrate the holding collar, or as through-openings, which penetrate the holding collar transversely to the insertion direction. By using such a holding collar, the fixing between holding frame and housing can be realised circumferentially along the entire insertion opening. Practically, the engagement elements and the counterpart engagement elements are largely evenly distributed in the circumferential direction.

In another advantageous further development, the holding frame can comprise a circumferential engagement groove, in which the engagement hooks are arranged and into which the holding collar dips. Because of this, exact positioning between holding collar and housing can be realised through the interaction of engagement groove and holding collar.

In another advantageous embodiment, the holding rim can comprise a completely circumferential sealing groove on an outside facing the holding flange, in which a seal contacting the holding flange is arranged. This sealing groove on the housing side can also be described as housing sealing groove in the following. The seal inserted therein can also be called housing seal in the following. With the help of this housing seal, which represents an axial seal acting parallel to the insertion direction, an efficient seal between charge air cooler and housing can be realised.

According to another embodiment, which can be realised additionally or alternatively to the above embodiment, the holding frame can comprise a completely circumferential sealing groove on an inner side facing the holding flange, in which a seal contacting the holding flange is arranged. This sealing groove on the frame side can be described as frame sealing groove in the following. The seal inserted therein can also be described as frame seal in the following. With the help of such a frame seal, which is configured as axial seal acting parallel to the insertion direction, an efficient preload of the holding frame against the holding flange of the charge air cooler parallel to the insertion direction can be realised. The sealing function with this frame seal is of subordinate importance. Particularly advantageous is a combination of the two above embodiments, so that both a housing seal as well as a frame seal are present. In this case, the preload for clamping the holding flange can be realised or amplified with the help of the two seals.

In another advantageous embodiment, a feed connection for feeding a coolant to the charge air cooler and a discharge connection for discharging the coolant from the charge air cooler can be arranged on the outer end region of the charge air cooler, preferentially within a region enclosed by the holding flange. Practically, feed connection and discharge connection are arranged on the outer end region face end with respect to the slide-in direction of the charge air cooler. Through this design, separate feed-through openings in the housing for the coolant connections of the charge air cooler are omitted.

According to another practical embodiment, the housing can comprise positioning elements on a wall located opposite the insertion opening, which interact with an inner end region of the charge air cooler for positioning the charge air cooler in the housing. In this way, the charge air cooler is positioned and thus adequately fixed on both its end regions relative to the housing.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar of functionally same components.

BRIEF DESCRIPTION OF THE DRAWINGS

It shows, in each case schematically.

DETAILED DESCRIPTION

Figure 1:
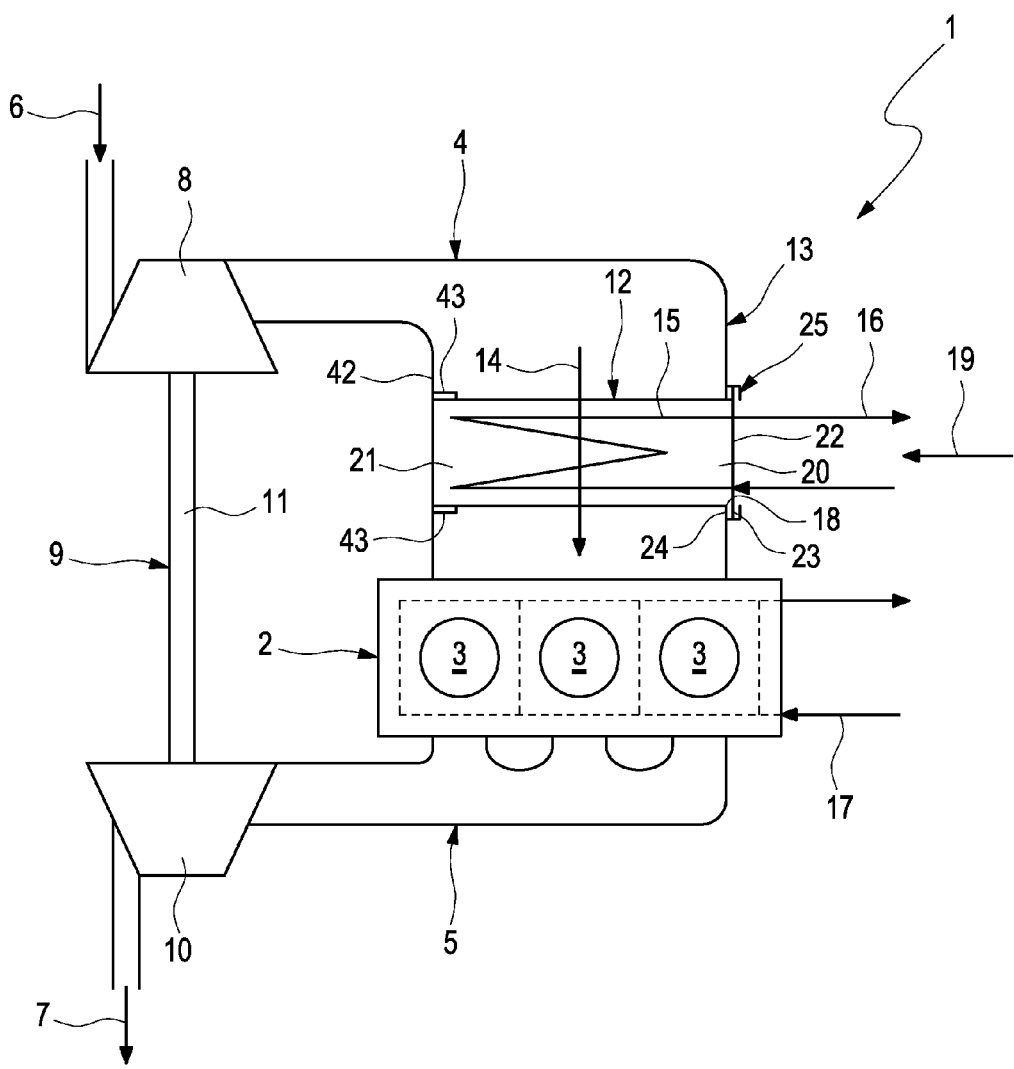
FIG. 1 a greatly simplified circuit diagram like representation of an internal combustion engine with a fresh air system, FIG. 2 a slightly isometric sectional view of the fresh air system in the region of an insertion opening for inserting a charge air cooler, FIG. 3 an isometric view of the charge air cooler in the region of the insertion opening.

According to FIG. 1, an internal combustion engine 1 comprises an engine block 2, in which a plurality of combustion chambers 3 is arranged. The combustion chambers 3 in this case are formed by cylinders, in which pistons are stroke-adjustably arranged. The internal combustion engine 1 furthermore comprises a fresh air system 4 for feeding fresh air to the combustion chambers 3 and an exhaust system 5 for discharging exhaust gas from the combustion chambers 3. A corresponding fresh air flow 6 is indicated by an arrow in FIG. 1. A corresponding exhaust gas flow 7 is indicated by an arrow in FIG. 1. The internal combustion engine 1 in this case is configured as a supercharged internal combustion engine 1. To this end, the internal combustion engine 1 is equipped with a suitable supercharging device, which in this case is formed by a compressor 8 of an exhaust gas turbocharger 9. To this end, the compressor 8 is arranged in the fresh air system 4. The compressor 8 or a compressor wheel which is not shown in more detail here is driven in the case of the exhaust gas turbocharger 9 with the help of a turbine 10 or a turbine wheel which is not shown here, for the purpose of which compressor 8 and turbine 10 are drive-connected by means of a common shaft 11. The turbine 10 is arranged in the exhaust system 5.

It is clear that the fresh air system 4 can include further components, such as for example a throttling device and a fresh air filter. It is clear, furthermore, that the exhaust system 5 can also include further components, such as for example a particle filter, a catalytic converter and a silencer.

The air which is compressed with the help of the compressor 8 is heated up through its compression at the same time. In order to re-cool the charge air, a charge air cooler 12 is arranged in the fresh air system 4, downstream of the compressor 8. For accommodating the charge air cooler 12, the fresh air system 4 comprises a housing 13, through which a fresh air path 14 is routed, which in FIG. 1 is symbolised by an arrow. The charge air cooler 12 is now arranged in the housing 13 so that the fresh air path 14 is routed through the charge air cooler 12. Accordingly, the fresh air can flow through the charge air cooler 12. In addition, the charge air cooler 12 comprises a coolant path 15, which is coupled in a suitable manner to the fresh air path 14 in a heat-transferring yet media-separated manner. The coolant path 15 can be connected to a charge air cooling circuit 16. This charge air cooling circuit 16 can be coupled to an engine cooling circuit 17 in a heat-transferring manner, which serves for cooling the engine block 2. Likewise, the charge air cooling circuit 16 and the engine cooling circuit 17 can be separate cooling circuits.

Figure 2:
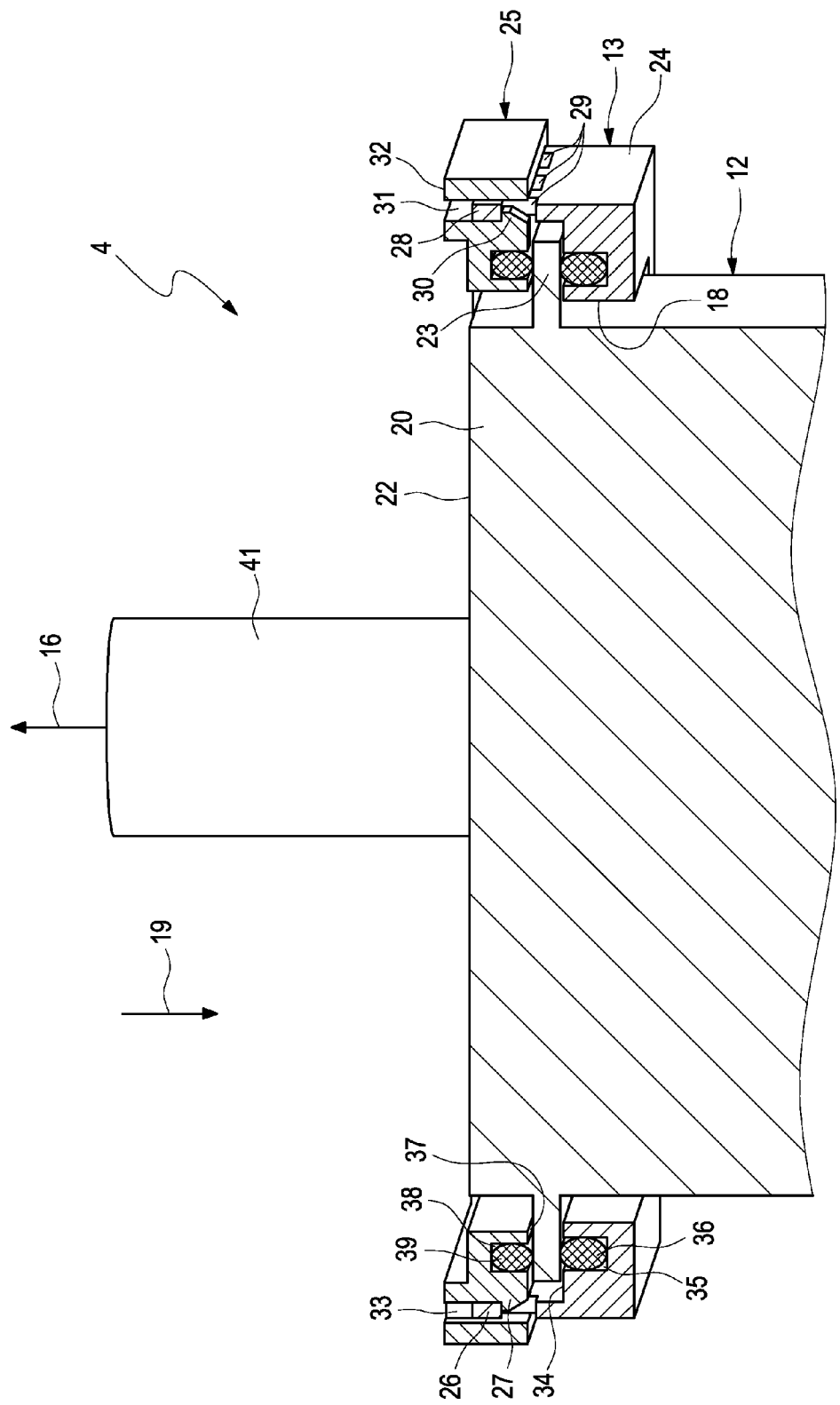
Figure 3:
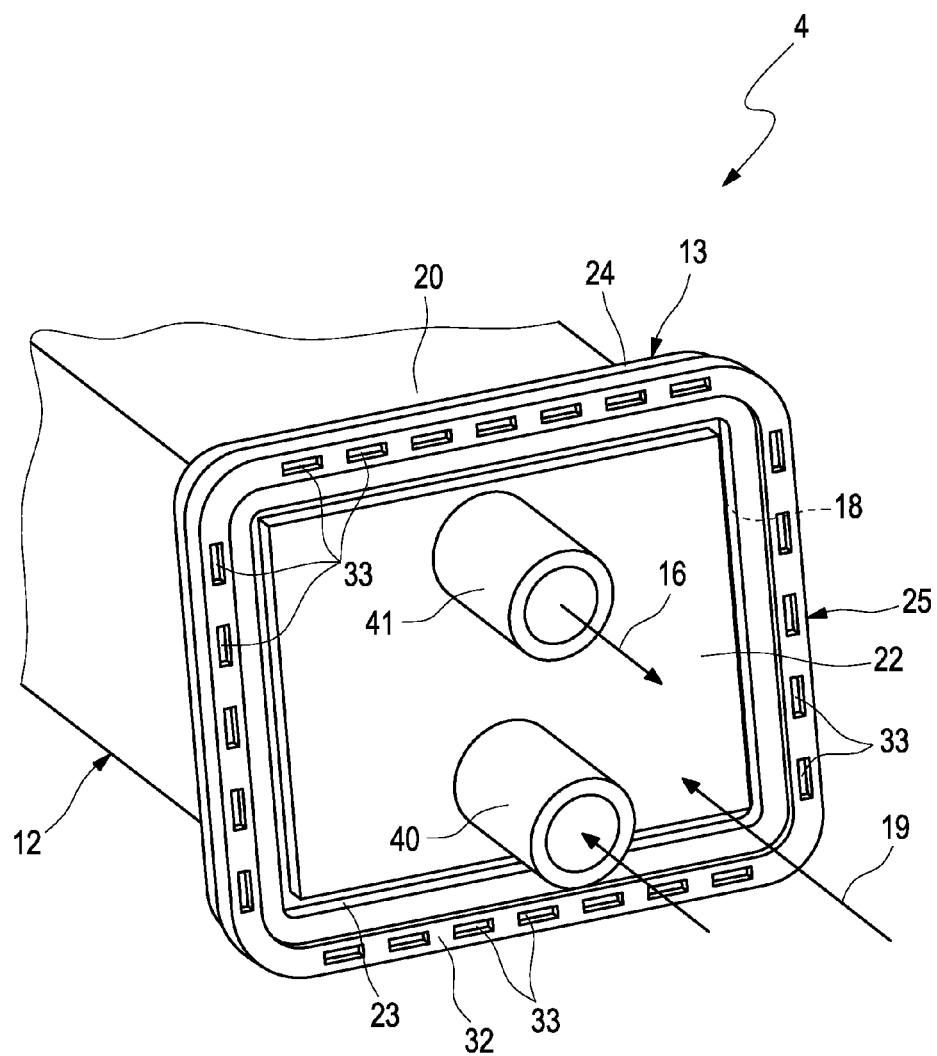

According to the FIGS. 1 to 3, the housing 13 comprises an insertion opening 18, through which the charge air cooler 12 in an insertion direction 19 or slide-in direction 19 is laterally inserted into the housing 13. The insertion direction 19 in this case is orientated transversely to the fresh air path 14. In the FIGS. 2 and 3, the housing 13 is only shown rudimentarily, namely only in the region of the insertion opening 18.

According to FIG. 1, the charge air cooler 12 comprises an outer end region 20 and an inner end region 21, which with respect to the insertion direction 19 are arranged distally from one another or facing away from one another. During the insertion of the charge air cooler 12 into the housing 13 the inner end region 21 leads and in the inserted state is located completely within the housing 13. In contrast with this, the outer end region 20, in the inserted state of the charge air cooler 12, forms a closure for the insertion opening 18. At least one face end 22 of the charge air cooler 12 facing away from the inner end region 21 or from the fresh air path 14, which is located on the outer end region 20, remains outside the housing 13.

According to the FIGS. 2 and 3, the outer end region 20 comprises a circumferential holding flange 23, which serves for fixing the charge air cooler 12 on the housing 13 in the region of the insertion opening 18. The housing 13 comprises a completely circumferential holding rim 24 enclosing the insertion opening 18. The fresh air system 4 introduced here is additionally equipped with a holding frame 25, which with respect to the charge air cooler 12 and with respect to the housing 13 is a separate component. The holding frame 25 serves for fixing the charge air cooler 12 on the housing 13 in the region of the insertion opening 18. To this end, the holding frame 25 is fastened on the housing 13, wherein the holding flange 23 is arranged and clamped in the insertion direction 19 between the holding frame 25 and the holding rim 24. Just as the holding flange 23, the holding frame 25 is a closed circumferential configuration. In particular, the holding frame 25 is a one-piece injection moulded part of plastic. In principle, the holding frame 25 however can also be produced from metal, in particular from light metal.

On the housing 13, engagement elements 26 are provided in the region of the insertion opening 18 or in the region of the holding rim 24. On the holding frame 25, counterpart engagement elements 27 are provided, which are configured and arranged complementarily to the engagement elements 26. The engagement elements 26 and the counterpart engagement elements 27 interact for fixing the holding frame 25 on the housing 13 and for clamping the holding flange 23. Insofar as the housing 13 is produced from plastic through injection moulding, the engagement elements 26 are practically moulded integrally thereon.

In principle, the engagement elements 26 and the counterpart engagement elements 27 can be configured in any way for as long as they can be used to realise an engagement between holding frame 25 and housing 13. Such an engagement in this case can preferentially manage entirely without additional fastening means.

Preferred in this case is the embodiment which is shown in the FIGS. 2 and 3, in which the engagement elements 26 comprise a holding collar 28, which preferentially runs closed circumferentially along the holding rim 24 and in the process projects from the housing 13 to the outside. The holding collar 28 comprises a plurality of engagement openings 29, which are arranged distributed in the circumferential direction. In the example of FIG. 2, the engagement openings 29 are designed as through-openings, which completely penetrate the holding collar 28. In another embodiment, the engagement openings 29 can also be designed as depressions, which do not penetrate the holding collar 28. The counterpart engagement elements 27 in this case comprise engagement hooks 30, which are dimensioned and arranged complementarily to the engagement openings 29 and which engage into the engagement openings 29. Through the engagement hooks 30 engaged with the engagement openings 29, the holding frame 25 is ultimately fixed on the holding collar 28 and thus on the housing 13. The holding collar 28 is preferentially integrally moulded on the housing 13.

The holding frame 25 can comprise a circumferential engagement groove 31, which is open towards the housing 13 and in which the engagement hooks 30 are arranged. The engagement groove 31 is formed complementarily to the holding collar 28 and arranged so that when attaching the holding frame 25 on the housing 13, the holding collar 28 dips into the engagement groove 31 in the slide-in direction 19. The holding frame 25 can comprise a plurality of breakthroughs 33 in the region of the engagement groove 31 on an outside 32 facing away from the housing 13. These breakthroughs 33 can in this case be dimensioned and arranged in particular so that the engagements between the individual engagement hooks 30 and the associated engagement openings 29 can be released through the break-throughs 33 using a suitable tool.

As is further evident from FIG. 2, the holding rim 24 can have a complete circumferential sealing groove 35 on an outside 34 facing the holding flange 23, which is open towards the holding flange 23. In this sealing groove 35 on the housing side, which is described as housing sealing groove 35 in the following, a housing seal 36 is arranged, which with respect to the insertion direction 19 acts as an axial seal and comes to bear against the holding flange 23. In the embodiment shown here, the holding frame 25 on an inner side 37 facing the holding flange 23 comprises a completely circumferential sealing groove 38, which is open towards the holding flange 23. In this sealing groove 38 on the frame side, which is described as frame sealing groove 38 in the following, a frame seal 39 is arranged, which with respect to the insertion direction 19 acts as an axial seal and comes to bear against the holding flange 23.

According to FIG. 3, a feed connection 40 for feeding a coolant to the charge air cooler 12 and a discharge connection 41 for discharging the coolant from the charge air cooler 12 are arranged on the outer end region 20 and preferentially on the outer face end 22 of the charge air cooler 12. Here, the face end 22, which comprises the two coolant connections 40, 41, is enclosed by the holding flange 23 and accordingly also enclosed by the holding frame 25.

As is evident from FIG. 1, the housing 13 can comprise positioning elements 43 on a wall 42 located opposite the insertion opening 18. In the inserted state of the charge air cooler 12, these interact with the inner end region 21 for positioning the charge air cooler 12 in the housing 13.

The invention claimed is:

1. A fresh air system for supplying combustion chambers of an internal combustion engine with fresh air, comprising:
   a housing, through which a fresh air path is routed,
   a charge air cooler arranged in the fresh air path,
   wherein the housing includes an insertion opening, through which the charge air cooler is laterally inserted along an insertion direction into the housing transversely to the fresh air path,
   wherein an outer end region of the charge air cooler closes off the insertion opening and includes a circumferential holding flange, the circumferential holding flange clamped axially with respect to the insertion direction between a holding rim enclosing the insertion opening and a separate circumferentially extending holding frame.

2. The fresh air system according to claim 1, wherein the holding frame is configured to be closed circumferentially.

3. The fresh air system according to claim 2, further comprising engagement elements provided on the housing in the region of the holding frame, wherein the engagement elements interact with counterpart engagement elements formed on the holding frame for fixing the holding frame on the housing and clamping the holding flange.

4. The fresh air system according to claim 3, wherein:
   the engagement elements include a circumferential holding collar along the holding rim which projects from the housing to outside the housing, the holding collar including a plurality of engagement openings; and
   the counterpart engagement elements have engagement hooks arranged complementary to the engagement openings, wherein the engagement hooks engage into the engagement openings and fix the holding frame on the holding collar.

5. The fresh air system according to claim 4, wherein the holding frame includes a circumferential engagement groove, in which the engagement hooks are arranged and into which the holding collar is received.

6. The fresh air system according to claim 1, further comprising engagement elements provided on the housing in the region of the holding frame, wherein the engagement elements interact with counterpart engagement elements formed on the holding frame for fixing the holding frame on the housing and clamping the holding flange.

7. The fresh air system according to claim 6, wherein the engagement elements are integrally moulded on the housing.

8. The fresh air system according to claim 6, wherein the holding rim on an outside facing the holding flange includes a circumferential sealing groove, and wherein a seal is arranged in the sealing groove and bears against the holding flange.

9. The fresh air system according to claim 8, wherein the holding frame on an inner side facing the holding flange includes a circumferential sealing groove, and wherein a seal is arranged in the sealing groove and bears against the holding flange.

10. The fresh air system according to claim 1, wherein the holding rim on an outside facing the holding flange includes a circumferential sealing groove, and wherein a seal is arranged in the sealing groove and bears against the holding flange.

11. The fresh air system according to claim 10, wherein the holding frame on an inner side facing the holding flange includes a circumferential sealing groove, and wherein a seal is arranged in the sealing groove and bears against the holding flange.

12. The fresh air system according to claim 1, wherein the holding frame on an inner side facing the holding flange includes a circumferential sealing groove, and wherein a seal is arranged in the sealing groove and bears against the holding flange.

13. The fresh air system according to claim 1, further comprising a feed connection for feeding a coolant to the charge air cooler and a discharge connection for discharging the coolant from the charge air cooler arranged on the outer end region of the charge air cooler.

14. The fresh air system according to claim 1, wherein the housing on a wall located opposite the insertion opening along the insertion direction includes positioning elements, wherein the positioning elements interact with an inner end region of the charge air cooler for positioning the charge air cooler in the housing.

15. A fresh air system for supplying combustion chambers of an internal combustion engine with fresh air, comprising:
   a housing, through which a fresh air path is routed;
   a charge air cooler arranged in the fresh air path;
   the housing including an insertion opening, through which the charge air cooler is laterally inserted into the housing transversely to the fresh air path;
   wherein an outer end region of the charge air cooler closes off the insertion opening and includes a circumferential holding flange, the circumferential holding flange clamped between a holding rim enclosing the insertion opening and a separate holding frame;
   an engagement element disposed on the housing in a region of the holding frame;
   a counterpart engagement element disposed on the holding frame, wherein the engagement element interacts with the counterpart engagement element to fix the holding frame on the housing and clamp the holding flange;
   wherein the engagement element includes a circumferential holding collar extending along the holding rim and projecting from the housing to outside the housing, the holding collar including at least one engagement opening; and
   wherein the counterpart engagement element includes at least one engagement hook arranged complementary to the at least one engagement opening, and wherein the at least one engagement hook engages into the at least one engagement opening and fixes the holding frame on the holding collar.

16. The fresh air system according to claim 15, wherein the holding frame includes a circumferential engagement groove, in which the at least one engagement hook is arranged and into which the holding collar is received.

17. The fresh air system according to claim 15, wherein the holding rim on an outside facing the holding flange includes a circumferential sealing groove, and wherein a seal is arranged in the sealing groove and bears against the holding flange.

18. The fresh air system according to claim 15, wherein the holding frame on an inner side facing the holding flange includes a circumferential sealing groove, and wherein a seal is arranged in the sealing groove and bears against the holding flange.

19. The fresh air system according to claim 15, further comprising a feed connection for feeding a coolant to the charge air cooler and a discharge connection for discharging the coolant from the charge air cooler arranged on the outer end region of the charge air cooler.

20. The fresh air system according to claim 15, wherein the housing on a wall located opposite the insertion opening includes positioning elements, wherein the positioning elements interact with an inner end region of the charge air cooler for positioning the charge air cooler in the housing.

* * * * *